Dec. 27, 1966   H. P. EICHENBERGER   3,294,989
POWER CONVERSION SYSTEM
Filed Sept. 25, 1961   7 Sheets-Sheet 1
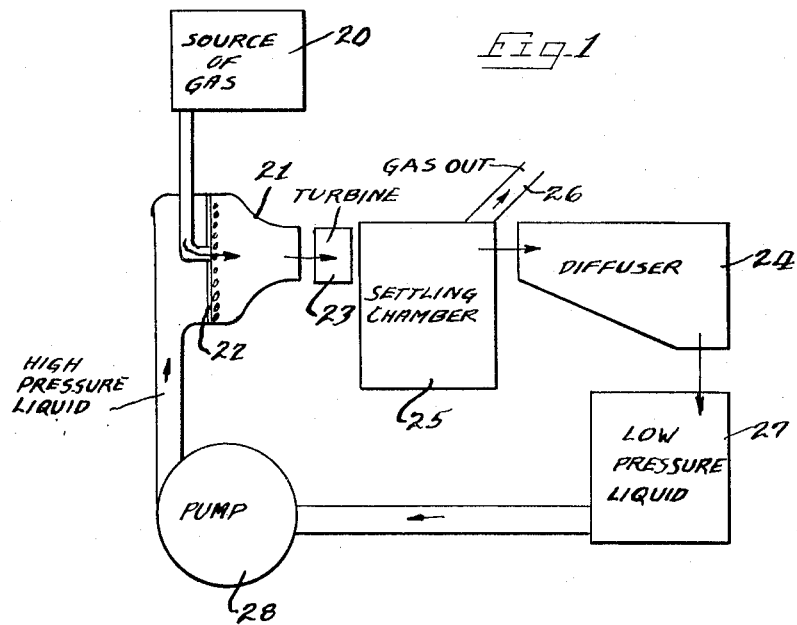
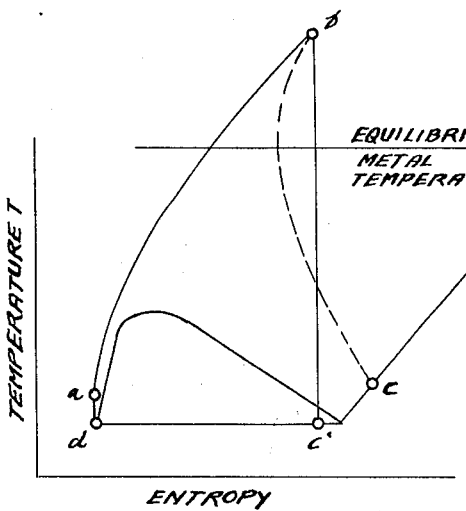
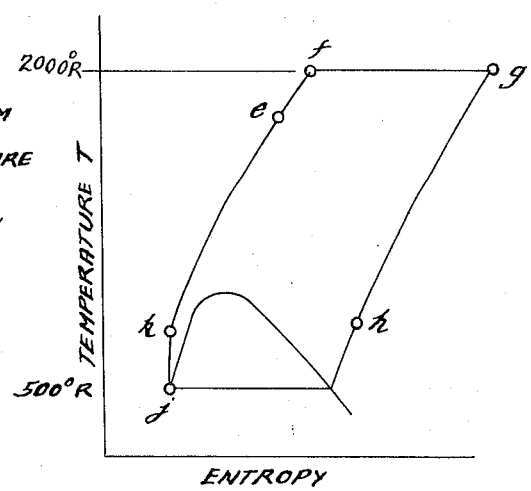
INVENTOR.
Hans P. Eichenberger
BY
ATTORNEYS INVENTOR.
Hans P. Eichenberger

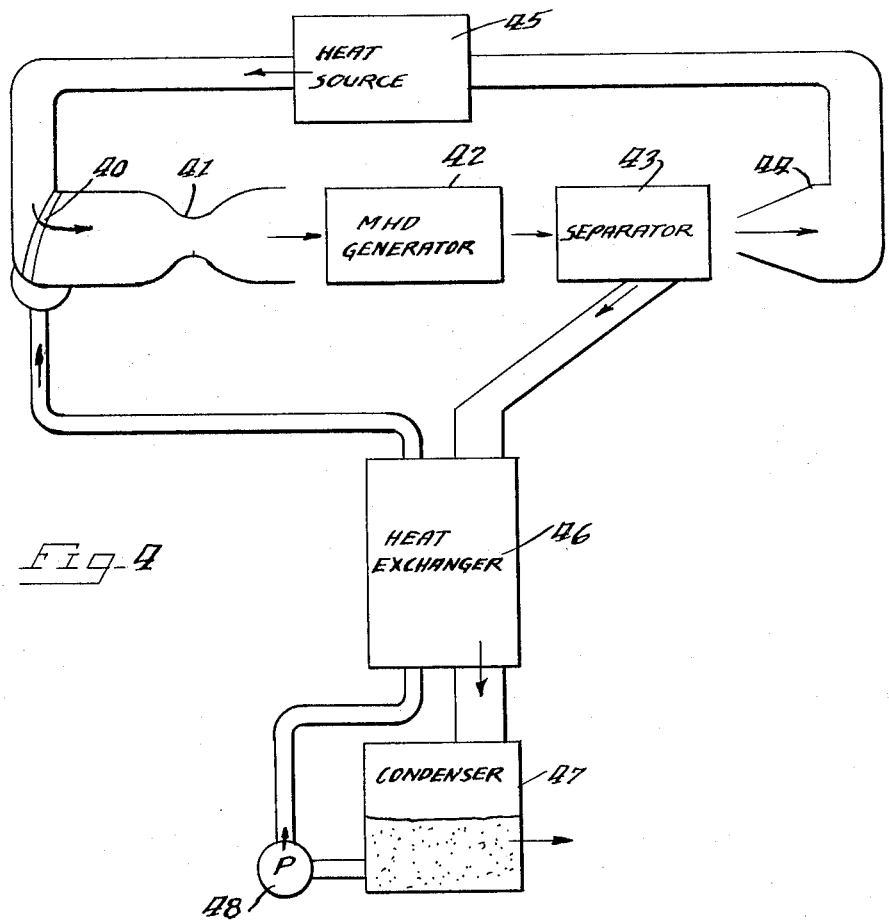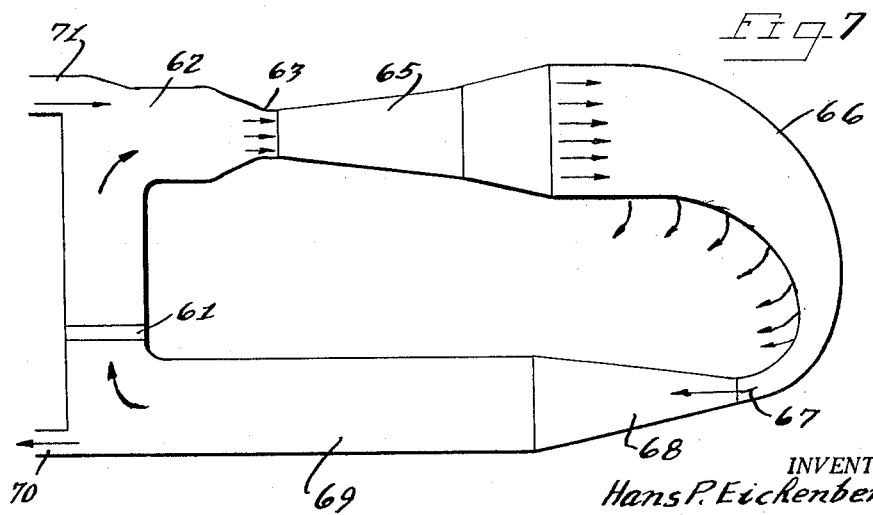

Dec. 27, 1966   H. P. EICHENBERGER   3,294,989
POWER CONVERSION SYSTEM
Filed Sept. 25, 1961   7 Sheets-Sheet 4
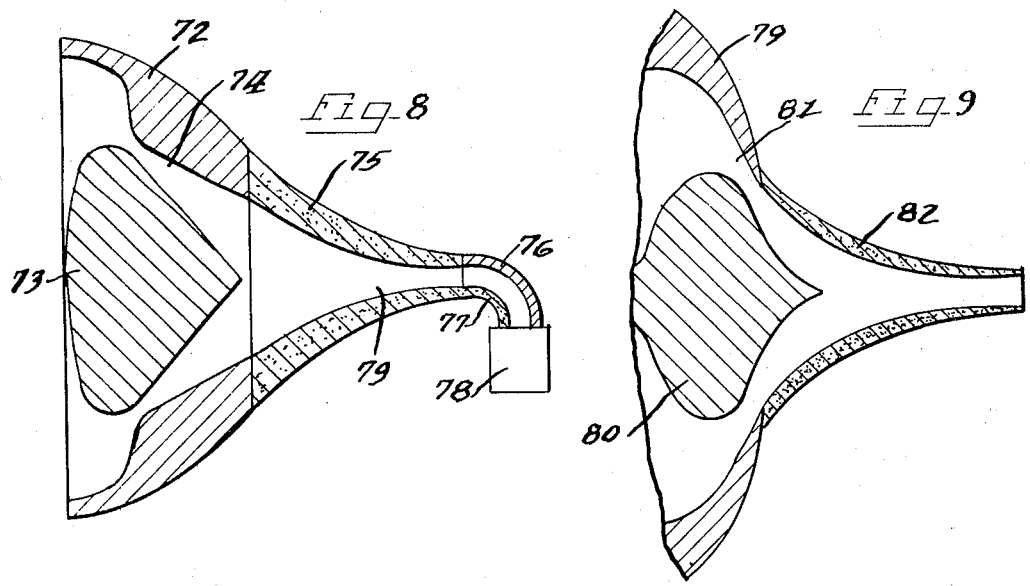
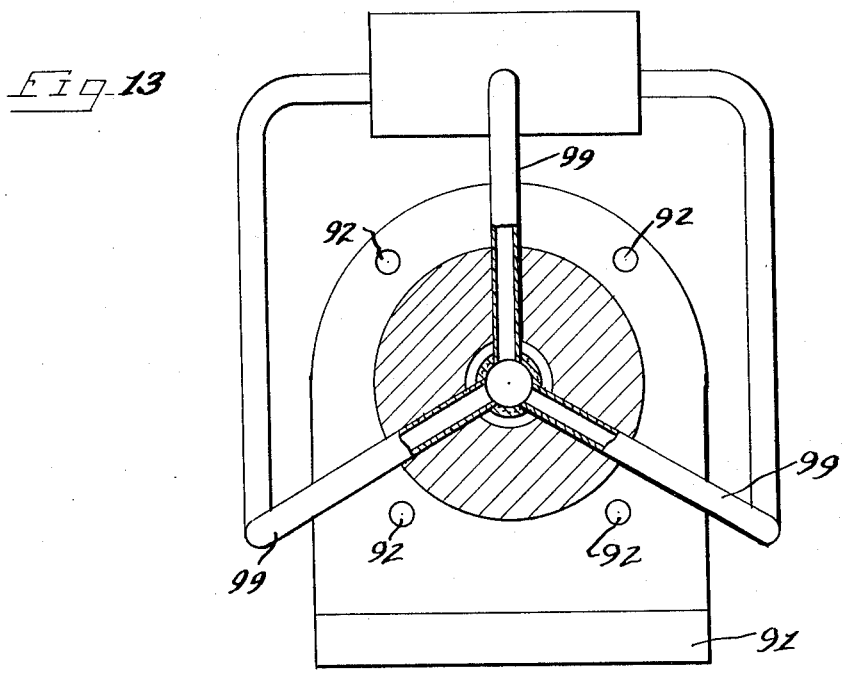
INVENTOR.
Hans P. Eichenberger
BY
ATTORNEYS

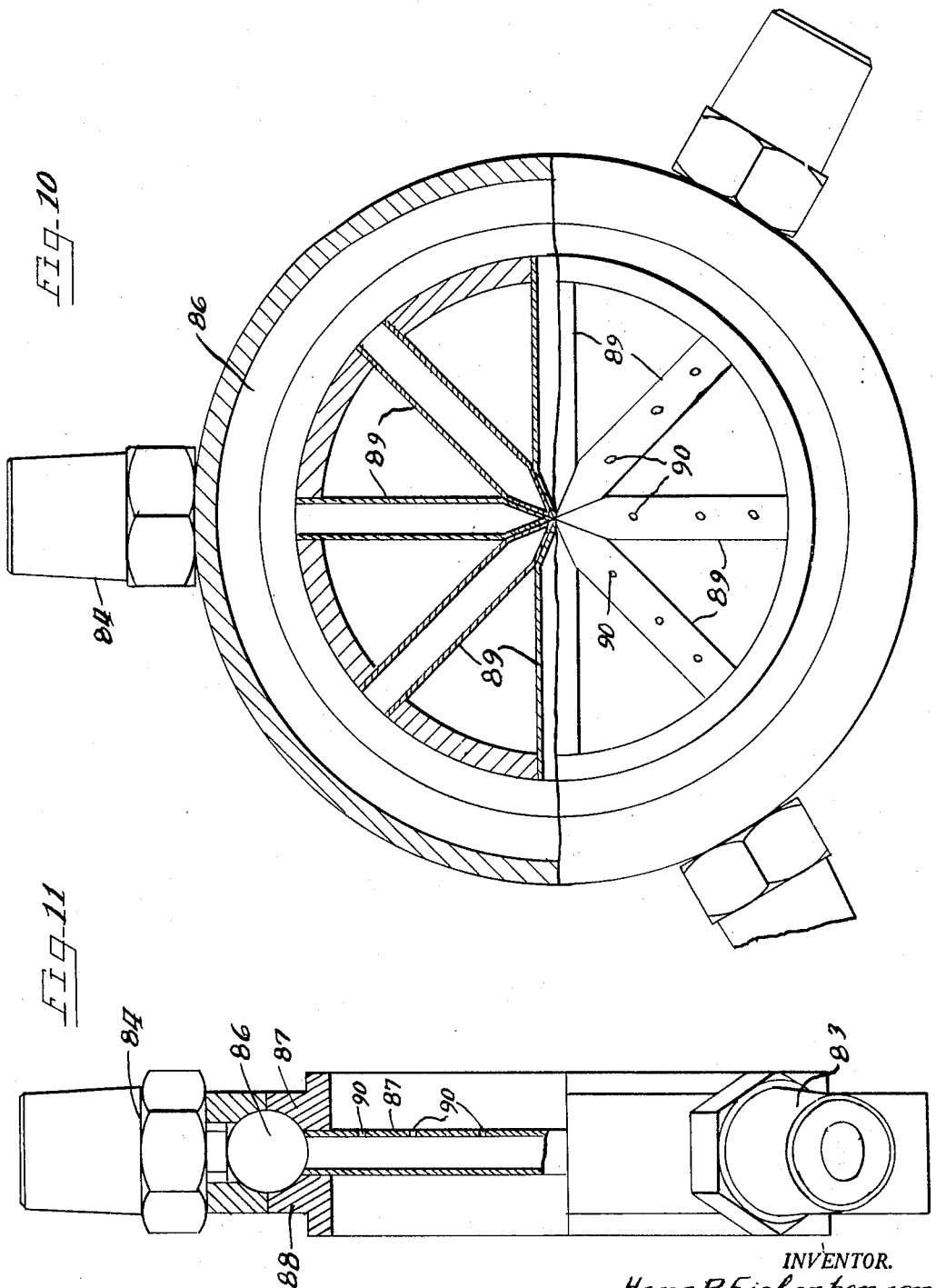

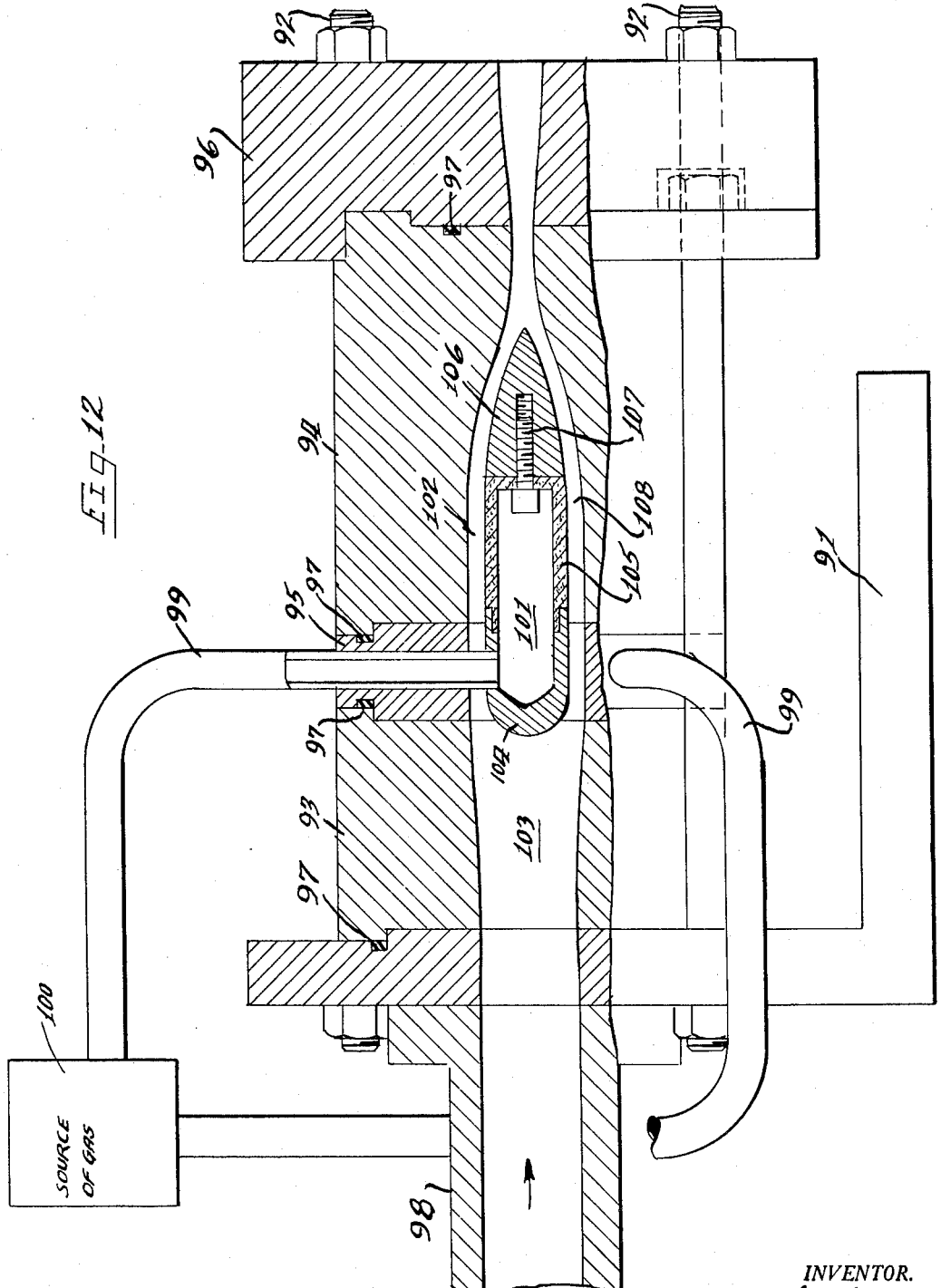

Dec. 27, 1966  H. P. EICHENBERGER  3,294,989
POWER CONVERSION SYSTEM
Filed Sept. 25, 1961  7 Sheets-Sheet 7
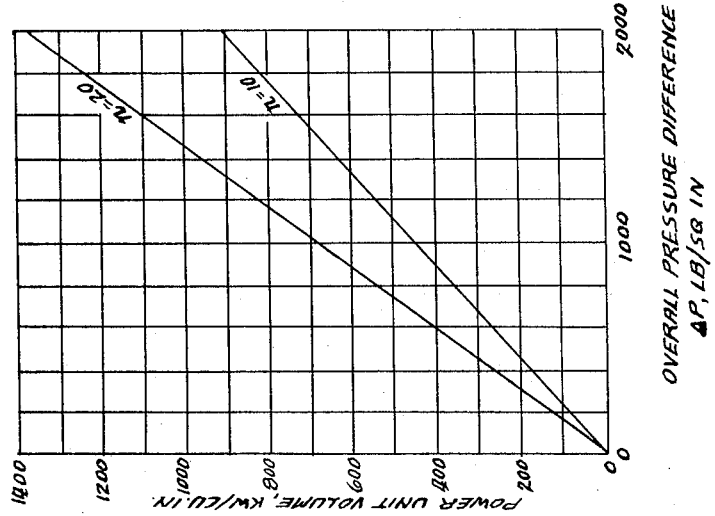
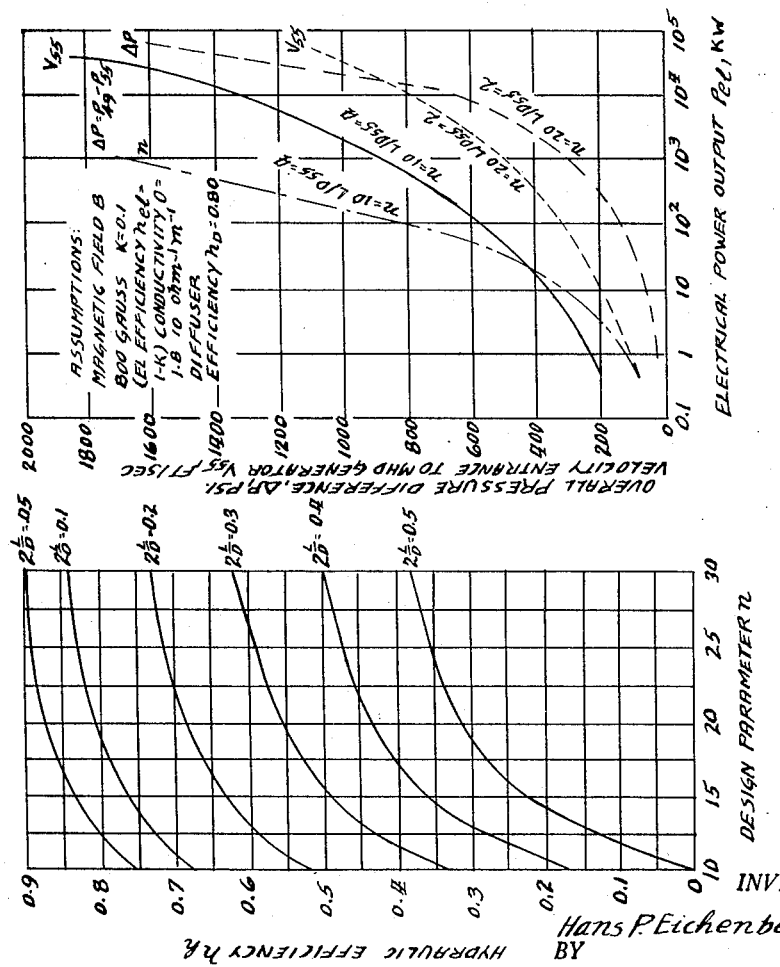
INVENTOR.
Hans P. Eichenberger
BY
ATTORNEYS United States Patent Office 3,294,989
Patented Dec. 27, 1966

3,294,989
POWER CONVERSION SYSTEM
Hans P. Eichenberger, Cleveland, Ohio, assignor to TRW, Inc., a corporation of Ohio
Filed Sept. 25, 1961, Ser. No. 140,275
11 Claims. (Cl. 310—11)

This invention relates to energy conversion systems and, more particularly, to apparatus wherein the energy available in a gas is transferred to a liquid and is used to drive an energy converter such as a generator of electricity.

In power units where a high pressure gas is available, the energy in the gas may be converted to useful mechanical energy or electrical energy. In auxiliary power units for space vehicles, the gas is usually available at a pressure on the order of 1000 p.s.i. and, since the ambient pressure is zero, a pressure ratio on the order of 1000 to 1 is obtained. Such a high pressure ratio together with a high initial temperature, such as 2000° R. and up, leads to extremely high nozzle velocities, on the order of 5000 to 10,000 feet per second.

If a turbine is driven by these gases, the tip speed must be an order of magnitude lower than this spouting velocity because of stresses and because of the existing available materials, and usually very low efficiency results. This efficiency is defined as the ratio of the resulting shaft power to the available power from the gas consumed. This condition is worsened by the fact that usually very low power is required, such as 1 to 10 horsepower, in space vehicles, so that the volume rate of flow of the gas is lowered and partial admission must be used, which further reduces the efficiency of the conversion device. As a result, with great engineering effort and skill, efficiencies between 20% and 30% are now being obtained.

When a magnetohydrodynamic device for generating electricity is being used rather than a turbine, other difficulties are created when using a conductive gas in these circumstances because a very high temperature is needed in the expanding gas to obtain even low conductivity.

The above difficulties are obviated or substantially reduced in accordance with this invention, and a system is provided which has very high efficiency and a very high power output per unit weight or volume. It is apparent that these factors are extremely important where power conversion systems for space vehicles are under consideration.

Accordingly, it is a primary object of this invention to provide an energy conversion system which has very high efficiency and a very high power output per unit weight or volume.

It is another object of this invention to provide an auxiliary power producing system for space vehicles where power may be produced over a relatively long period of time such as one day or more.

It is another object of this invention to provide an energy conversion system which has a continuous flow process without mechanical moving parts.

It is still another object of this invention to provide an energy conversion system which converts heat to electricity at an efficiency closer to the Carnot efficiency than any other known direct conversion device.

It is still another object of this invention to provide apparatus for injecting streams of gas bubbles into a liquid in such a manner that the liquid is accelerated to high velocities.

It is a still further object of this invention to provide apparatus for separating gas from liquid.

These and other objects of the invention are attained by providing apparatus that includes a flow channel for a liquid, means for injecting a gas into the liquid flowing through the channel in such a manner that the gas forms a plurality of relatively small bubbles which cause the velocity of the liquid to increase, and an energy converter coupled to receive the high speed liquid. The liquid may be connected to drive an impulse or reaction type turbine, or, in the event a liquid is used that is a good conductor of electricity, the liquid can be passed through a magnetohydrodynamic device for generating electricity.

This invention may be better understood and other objects, features and advantages more apparent from the following detailed description taken in conjunction with the accompanying figures of the drawings, in which:

FIGURE 1 is an illustration of an energy conversion system constructed in accordance with the invention employing a turbine;

FIGURE 3 is a temperature-entropy diagram illustrating the operation of the invention;

FIGURE 4 is an energy conversion system for generating electricity, constructed in accordance with another embodiment of the invention;

FIGURE 5 is another temperature-entropy diagram illustrating the operation of the invention;

FIGURE 7 is an energy conversion system constructed in accordance with the invention wherein the magnetohydrodynamic generator is integral with a nozzle;

FIGURE 8 is an apparatus constructed in accordance with the invention for separating gas from liquid metal without incurring viscous losses at high velocities;

FIGURE 9 is an illustration of another apparatus for separating gas from liquid metal without incurring viscous losses at high velocities;

FIGURE 10 is an illustration of an apparatus partially in section or injecting gas into a a liquid;

FIGURE 11 is a sectional view taken along the line XI—XI of FIGURE 10;

FIGURE 12 is a view in side elevation and partially in section illustrating another apparatus for injecting gas into a liquid;

FIGURE 13 is a view taken along the line XIII—XIII of FIGURE 12; and

FIGURES 14–16 are curves illustrating the operation of the invention.

As shown on the drawings:

Figure 2:
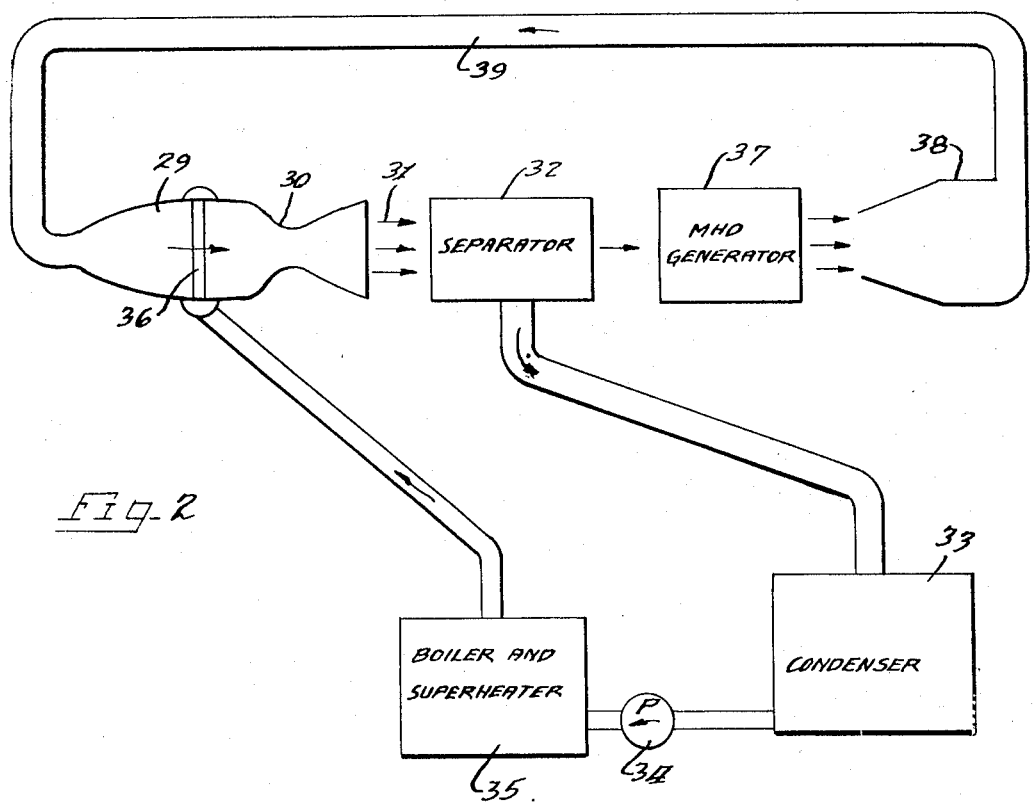
FIGURE 2 is an electrical energy generating system in accordance with the invention using a magnetohydrodynamic generator.

With specific reference to FIGURE 1, a source 20 of very hot high pressure gas is connected to the inlet of a nozzle 21 in such a manner that the gas is injected by a device 22 into a liquid flowing through the nozzle in the form of many tiny bubbles. As the liquid expands through the nozzle 21, the bubbles expand and perform their available work on the liquid. In this manner, the available work in the highly compressed gases is given up to the liquid which assumes kinetic energy. Since this kinetic energy is essentially equal to the work available from the gases, the spouting velocity of the mixture of liquid and gas is reduced by several orders of magnitude below the spouting velocity which the gas would have had alone, because the mass of the working medium has been increased by several orders of magnitude. Calculations have shown that the optimum ratio of liquid to gas depends on a particular application and may vary between the values of 10 to 10,000.

In the embodiment of the invention illustrated in FIGURE 1, the high velocity mixture of liquid and gas is fed into a turbine 23 which may be connected to drive a conventional electrical generator or mechanical device. This turbine, which uses the kinetic energy of the liquid, may have a tip speed which leads to an optimum efficiency since the tip speed is not limited by stresses. This leads to considerably higher efficiency than if the gas were used alone. In addition, the volume rate of flow of the mixture of liquid and gas is larger and therefore partial admission is not necessary. This is true because of the very low turbine tip speed required. The diameter of the turbine can also be made arbitrarily small without increasing its r.p.m. to values which lead to engineering difficulties. In fact, the r.p.m. of the turbine can be chosen so that a gear box is eliminated, even with full admission.

The turbine 23 may be either an impulse or a reaction type. In the case of a reaction type turbine, the bubbles may further expand and do work on the liquid while expanding in the turbine wheel.

The exhaust from the turbine 23 is directed to a diffuser 24 where the kinetic energy of the liquid is reduced to as small a value as possible. Before entering the diffuser 24, however, it is preferred to pass the mixture through a settling chamber 25 which separates the gas from the liquid. The gas leaves the chamber 25 through a conduit 26 and the low pressure liquid enters a chamber 27. A conventional pump 28 draws the liquid from the chamber 27 and pumps the liquid to a high pressure at the nozzle 21 inlet where further available gas is injected into the liquid in bubble form.

It is apparent that mechanisms other than a settling chamber may be used to separate the gas from the liquid. For example, a vortex separator could also be used.

In the embodiment of the invention illustrated, it is important from the standpoint of efficiency that the hot gas bubbles expand within a very short time after they have been exposed to the relatively cold liquid. The order of magnitude of the expansion period is of the order of several thousandth of a second. Due to this requirement, the bubbles must be injected into the liquid with a fairly high velocity and the distance from the bubble injection to full expansion of the gas-liquid mixture must be short.

The gas from the source 20 may consist of a substance which is entirely foreign to the liquid or it may contain vapor of that liquid (such as using part steam as the gas and water as the liquid) or the gas may consist entirely of the same substance as the liquid. In the latter case, when using water as the liquid a new form of wet steam turbine in thermodynamic non-equilibrium is provided.

In the embodiment of the invention illustrated in FIGURE 2, a power conversion system is provided having very high efficiency and high power output per unit weight and volume which operates by transferring energy from a hot expanding gas to a liquid metal in a continuous flow process without mechanical moving parts. FIGURE 3 shows the temperature-entropy diagram for the working gas, which is a condensible substance, with a short nozzle (little heat transfer between metal and gas).

With reference to FIGURE 3, the working gas absorbs heat which is available to the system by being heated up from state $a$ to state $b$. Ideally, from state $b$ to state $c'$, this working gas performs work which is transmitted, as will be presently explained, to the liquid metal. From state $c'$ to state $d$ heat is rejected to the surroundings. While this working gas, as shown, is used in a super-critical state the principle of the system does not necessarily require this; in fact, a working substance which could be used over the prescribed temperature range with a minimum of superheat would be more desirable since the Carnot efficiency between the given temperature limits can be more closely approached. However, it is essential that this working gas be condensible such that the compression work from $d$ to $a$ is very small as compared to the work that is available while the fluid expands from $b$ to $c'$.

With specific reference to FIGURE 2, the liquid in the system is a metal which is electrically conductive and is introduced at high pressure at the entrance 29 to a nozzle 30. At this point, the hot gas, which is at state $b$ FIGURE 3, is injected by a device 36 in the form of bubbles into this liquid metal. This mixture of hot gas and liquid metal expands through the nozzle 30 to a low pressure at the point 31. At this point, the gas has transferred its available energy (which is indicated in FIGURE 3 by the temperature drop from states $b$ to $c'$) to the liquid metal which now possesses this energy in the form of kinetic energy. However, the velocity of the liquid metal is of an order of magnitude smaller than the velocity which the gas would have if it would be expanded alone through the same pressure ratio in a De Laval nozzle. More specifically, the ratio of the velocity of the metal at the exit of the nozzle 30 to the velocity which the gas would possess if it would expand all alone is equal to the square root of the ratio of the mass of the gas to the mass of the metal.

This high velocity stream of metal and gas is separated in a separator 32, FIGURE 2. At this point, the gas is at state $c$, FIGURE 3. Indeed, the metal temperature is below the gas temperature at the inlet of the nozzle. As a result, heat transfer from the gas to the metal occurs in the initial part of the nozzle, and the change of the state of this gas will follow a line as indicated by the dashed line in FIGURE 3 to the left of the isentropic line in the first part of the nozzle. In the latter part of the nozzle, this process is reversed in the sense that the heat is transferred from the metal to the gas such that the end state $c$ of the gas has a larger entropy than the initial state $b$. At state $c$, the working fluid enters a condenser 33 where heat is rejected, reducing the gas to the liquid state $d$ shown in FIGURE 3.

A conventional pump 34 is connected to the output of the condenser 33 which pumps the condensed liquid to a boiler and superheater 35, which may be supplied with heat from any conventional heat source. The pump 34 may be any conventional type such as a centrifugal or injection pump or, in fact, it may be a bubble-to-liquid energy exchange device of the type disclosed in this application.

After the liquid, which is at state $a$, FIGURE 3, is heated in the boiler and superheater 35 to state $b$ it is once again injected in the form of bubbles into the liquid metal by the injection device 36.

The liquid metal separated from the gas by the separator 32 leaves the separator at high velocities. A magnetohydrodynamic generator 37 of electricity is connected to the output of the separator and transforms a percentage of the kinetic energy of the liquid metal into electricity in accordance with well known principles. At the end of this transformation of kinetic energy to electricity, a sufficient amount of kinetic energy is left so that the pressure rise from the low pressure point of the working cycle to the high pressure point can be overcome by a diffuser 38. The liquid metal then reenters the nozzle 30 by way of a fluid passageway 39.

It is apparent in the system illustrated in FIGURE 2 that no heat exchanger is put into the liquid metal loop. Consequently, the metal assumes an average temperature as indicated in FIGURE 3. FIGURE 4 illustrates an embodiment of the invention where heat is added to the liquid metal in a heat exchanger. In this case, the liquid metal temperature is the highest temperature which occurs in the cycle, and the working gas in injected at a lower temperature than the metal, as indicated by state $e$ on FIGURE 5, and heated up by the metal at a constant pressure to the state $f$. After expansion through a nozzle, the end state of the working gas is at state $g$ due to heat addition to the gas from the liquid metal.

With specific reference to FIGURE 4, gas is injected by a device 40 into the liquid metal at the entrance to a nozzle 41. The mixture leaves the nozzle 41 and enters a magnetohydrodynamic generator 42 of electricity and then passes into a separator 43. The liquid metal leaving the separator 43 passes through a diffuser 44 and a heat source 45 before reentering the nozzle 41.

In order to obtain good thermodynamic efficiency, the gas from the separator 43 is cooled first in a heat exchanger 46, where the expanded gas is cooled from state $g$ to state $h$ in FIGURE 5. The gas then passes to a condenser 47 where it is reduced to a liquid. A conventional pump 48 then pumps the liquid through the heat exchanger 46 and returns it to the gas injection device 40. The compressed liquid leaving the pump 48 is heated in the heat exchanger 46, by the heat extracted from the gas leaving the separator 43, from state $k$ to state $e$ in FIGURE 5.

A cycle in which the liquid metal has the highest temperature may be particularly attractive if the liquid metal is compatible with the removal of heat from a nuclear reactor and with the working gas. This simply presupposes that the working gas does not chemically react with the hot liquid metal.

If desired, in the arrangement of FIG. 4 the position of 42 and 43 may be interchanged so that the mixture leaving the nozzle 41 first passes through the separator 43 before entering the generator.

It is clear that the magnetohydrodynamic generator 37 shown in FIGURE 2 after the separator 32 does not have to by physically different from the separator or even from the nozzle 30. In fact, in the following discussion three possible realizations of the cycle are considered. In the first, a kinetic energy converter, the magnetohydrodynamic generator and the separator are at least in part the same unit. In the second, the displacement energy converter which is defined by the fact that the gas is performing work on the liquid metal by expanding, the nozzle spans the location of the magnetohydrodynamic generator. The combined nozzle and magnetohydrodynamic generator is then followed by the separator. In the third embodiment, these two designs are combined.

Figure 6:
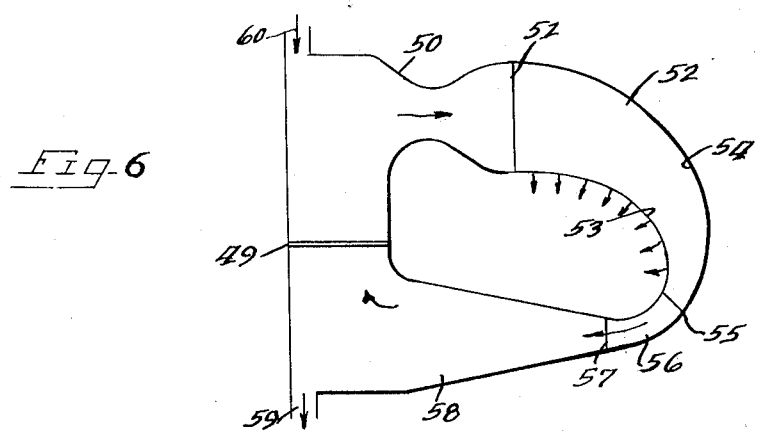
FIGURE 6 is an energy conversion system constructed in accordance with the invention wherein the magnetohydrodynamic generator is separate from a nozzle.

FIGURE 6 is an illustration of the kinetic energy converter wherein the available energy in the gas is converted entirely into kinetic energy of the liquid metal which is then converted into electric energy. This device can be used in two ways. In the first way, the temperature-entropy diagram for which is illustrated in FIGURE 3, the gas is injected at a higher temperature than the metal and is expanded in an extremely short nozzle under thermal non-equilibrium in such a manner that a minimum heat exchange between the expanding gas and the surrounding metal occurs. The gas is somewhat cooled at the beginning of the expansion, and in the latter part of the exchange heat is transferred from the metal to the gas. The goal of a good design is to minimize this heat transfer, especially at the first part of the cycle. In any event, the temperature of the working gas at the exit is considerably lower than the temperature which the metal will assume under steady state conditions.

Another use of the kinetic energy converter is to make the nozzle sufficiently long that the gas and the liquid metal are at all times in essentially thermal equilibrium, i.e., the gas and the metal are at the same temperature. In this case, the temperature of the metal is the highest cycle temperature and is similar to the system illustrated in FIGURE 4. FIGURE 6 specifically shows this design in which the gas is introduced by a gas injection device 49 at a temperature which is somewhat cooler than the temperature of the metal, as indicated by the gas state $e$ in FIGURE 5. In the low velocity region between the gas injection device 49 and the entrance to a nozzle 50, the gas is heated up to the temperature of the liquid metal at state $f$, FIGURE 5. From the entrance to the nozzle 50 to the exit 51 in FIGURE 6, the gas and the liquid metal expand, the gas giving up its energy to accelerate the liquid metal. The mixture leaving the nozzle 50 then enters a vortex separator 52 which separates the liquid metal from the gas. The low pressure gas is removed through the liquid gas interface 53, while the heavy liquid metal moves toward the outside wall 54.

At the exit 55 of the separator 52, essentially a pure metal jet remains containing only extremely small gas bubbles. This metal jet then enters a magnetohydrodynamic generator 56. In accordance with well known electrical theory, a magnetic field is set up which acts perpendicularly to the drawing of FIGURE 6 and the power is taken off at the sides of the metal jet.

As the electricity is taken out, a decelerating force acts on the metal jet and at the exit 57 of the generator 56 the kinetic energy of the metal jet is decreased below the kinetic energy at the exit 55 of the separator 52 by an amount which is equal to the electric power being taken out divided by the conversion efficiency.

At the exit 57 of the generator 56 the last remaining bubbles of gas leave the metal jet which enters a diffuser 58 with just enough kinetic energy left to overcome the pressure increase between the exit 57 of the generator 56 and the gas injection device 49.

During the expansion of the gas, the work which the gas performs on its surroundings is directly supplied by the heat conducted from the liquid metal to the gas, and the liquid metal is cooled. Since the mass ratio of the metal to the gas is large, however, of an order of 100, the temperature variation in the metal is small. However, the metal must be heated up again and this is done by removing a portion of the metal by means of a conduit 59, passing it through a suitable heat exchanger (not shown) and returning it to the cycle by means of a conduit 60.

The kinetic energy converter, discussed above, can be used in conjunction with either of the two cycles illustrated in FIGURES 2 and 4. The displacement energy converter, however is preferably used in conjunction with the cycle illustrated in FIGURE 4. The two cycles differ essentially in the way heat is added. The cycle shown in FIGURE 2, the heat is added to the working fluid while in the cycle illustrated in FIGURE 4 the heat is added to the liquid metal. Both of these cycles can use either a rapid expansion of the gas, as illustrated by the diagram of FIGURE 3, or a slow expansion where the temperature of the expanding gas and the temperature of the liquid metal are essentially the same, as illustrated by the diagram of FIGURE 5. However, the displacement energy converter system shown in FIGURE 7, can only use slow gas expansion since the gas must be in contact with the liquid metal for a relatively long time for good efficiency. Therefore, the metal must be hot.

With specific reference to FIGURE 7, compressed working gas is introduced by a device 61 into the liquid metal and is heated by the metal to the metal temperature by the time the bubbles arrive at the entrance 62 of a nozzle 63. In the nozzle 63, the liquid metal and the working gas expand through a relatively small pressure ratio which depends on the desired size of the system. This pressure difference also determines the velocity of the mixture sent to a magnetohydrodynamic generator 65. The generator body forces tend to decrease the velocity of the mixture; however, a pressure drop exists between the entrance to the generator and the exit which counteracts these forces such that the overall velocity at the entrance and the exit of the generator remains essentially constant. Since the gas expands while passing through the generator 65, the volume increases and, to keep this velocity essentially constant, the area of the generator has to increase, and reaches a maximum area at the exit.

Between the exit of the generator 65 and the entrance to a separator 66 the velocity of the mixture of liquid metal and gas is further increased to a velocity such that sufficient kinetic energy is present at the entrance to the separator 66 to overcome the losses in the separation chamber and also to overcome the pressure rise through a diffuser 68 connected to the outlet 67 of the separator 66.

The liquid metal is then returned by a fluid passageway 69 to the point of the injection device 61 where additional gas is injected into the liquid metal. A portion of the liquid metal is also withdrawn by a conduit 70 and passed through a suitable heater and returned to the system by means of a conduit 71.

Although the displacement energy converter and the kinetic energy converter are essentially the same in principle, there are some differences. In the displacement energy converter, the magnetohydrodynamic generator is located in an area which may be called a nozzle and before the device which separates the working gas from the liquid metal. This has an advantage in that a relatively large volume can be used for the generation of electricity at low velocity. In this way, the hydraulic losses associated with a high speed magnetohydrodynamic generator are minimized, and the velocities in the magnetohydrodynamic generator can be as low as desired, thereby reducing the losses to arbitrarily small values. It is apparent, however, that the size of the apparatus will also be increased. Another advantage of the displacement energy converter is that the gas can be separated from the liquid metal at velocities which are considerably lower than possible in the kinetic energy converter. Therefore, losses which may occur in the separator are of less importance. A possible limitation results from the requirement that the liquid metal be electrically conductive which means that the liquid metal must not be disrupted by lanes of gas which may occur if the gas volume flow rate exceeds the liquid metal volume flow rate by a large multiple.

The kinetic energy converter and the displacement energy converter are two extreme possibilities for use of the basic system described in connection with FIGURES 2 and 3. Optimum performance for a given power output may be obtained, however, by a combination of these two devices.

The devices illustrated in FIGURES 8 and 9 are designed to separate the gas from the liquid metal without incurring viscous losses at high velocities, as might occur when using a vortex separator. It will be recalled that in the separators described in some of the previously described embodiments of the invention, the metal and gas were separated by turning the mixture around a bend by means of a solid wall.

With specific reference to FIGURE 8, the preliminary separation of gas from the liquid metal is achieved without the friction which might otherwise occur when the metal touches the solid wall. This is accomplished by providing apparatus that includes an outer wall 72 and a plug member 73 which define a nozzle 74 between them. This nozzle is designed to produce a mixture of gas and metal which is strongly convergent toward the axis of symmetry of the nozzle. Therefore, the individual droplets of the liquid metal converge toward the center of the jet while the gas bubbles escape toward the outside of the axisymmetrical jet. This gas surrounds the metal jet 79 in region 75 while a dense jet of metal 79 enters a secondary separator 76 where separation of the gas and metal is achieved by means of a solid wall. In the secondary separator 76, the remaining gas bubbles leave through another gas region 77. In both separators a porous wall may adjoin the gas region 77 away from the liquid to reduce contact between the liquid and the wall. The liquid metal leaving the secondary separator 76 then enters a magnetohydrodynamic generator 78. The remainder of the system may be as described in the previous embodiments.

In regard to FIGURE 9, a similar nozzle having an outer wall 79 and an adjustable center piece 80 is provided which has a nozzle throat 81. However, the outside wall of the divergent section of the structure is left away, which reduces the friction occurring there and still allows the mixture of gas and liquid to expand. Again, a region 82 of gaseous material may be disposed at the divergent section. Once again, the remainder of the system (not shown) may be as described with regard to the previous embodiments of the invention.

Two devices are illustrated in FIGURES 10–13 for injecting gas into the liquid metal. With specific reference to FIGURES 10 and 11, a source of gas (not shown) is connected to three symmetrically disposed tube fittings 83–85 which are in communication with a header or manifold 86 which is formed between two annular members 87 and 88. The two members 87 and 88 may be soldered or welded together and to the fittings 83–85. The inner diameter of the header 86 is connected to feed a plurality of hollow tubes 89, each of which has a radially extending series of holes 90 formed in it. The tubes are joined together at the center by soldering or welding. This injection device is adapted to be disposed in a fluid passageway in such a manner that fluid flow of the liquid metal between the tubes 89 is from left to right as seen in FIGURE 11. The holes 90 are formed in the tubes or struts 89 on one side only in such a manner that they inject gas toward the downstream side of the injection device.

In the injection device illustrated in FIGURES 12 and 13, injection occurs not through a plurality of holes but through a member having a porous wall. This device includes an L shape stand 91 on which are mounted by means of four bolts 92, two hollow cylindrical members 93 and 94, an annular member 95, and an end member 96. The members 93–96 are held in place on the stand 91 by the bolts 92 and have a series of O-ring seals 97 disposed between them. The end member 96 is adapted to be connected to a fluid passageway and the stand 91 is connected to a conduit 98 which is also adapted to be connected to a fluid passageway. The annular member 95 is formed with three symmetrically disposed conduits 99 which are coupled to a source 100 of gas. These three tubes 99 are also connected to feed the gas into the hollow interior 101 of an injector plug 102 which is symmetrically disposed in a fluid passageway 103 formed in the members 93–95.

The injector plug 102 includes an upstream end member 104 which is fastened to the tubes 99 by soldering or welding, a cylindrical center member 105 which is made of a gas porous material, and a downstream end member 106 which is fastened to the center member 105 by a bolt 107. The upstream end member 104 and the center member 105 may be fastened together by suitable means such as a press fit.

The outer wall of the fluid passageway 103 formed by the members 93–96 forms, in conjunction with the injector plug 102, a nozzle having its throat at 108.

In operation, liquid metal flows through the coupling 98 and the fluid passageway 103 from left to right as seen in FIGURE 12 and around the injector plug 102. Simultaneously, gas flows from the source 100 to the chamber 101 formed in the injector plug 102 by way of the three tubes 99. Since the center wall 105 of the injector plug is porous to gas, this gas flows through the member 105 and mixes with the liquid metal passing through the device.

It is clear that combinations of the two devices illustrated in FIGURES 10 and 12 are possible. For example, instead of providing holes in the tubes 89 shown in FIGURE 10, tubes can be provided having porous walls instead of holes.

In regard to the materials employed in the systems using magnetohydrodynamic electrical generators, a suitable electrically conductive liquid such as mercury or sodium may be used. The choice of material for the working gas will depend upon the liquid metal used. The working gas must not decompose or combine with the desired liquid metal at high temperatures. In addition to being a material which is chemically inert, such as argon, the material should also have desirable characteristics in terms of thermodynamic performance.

The optimization calculations presented below are provided to give a clear quantitative explanation of the operation of the kinetic energy converter. The following is a list of symbols used in these calculations:

A—cross-sectional area of duct
B—magnetic field strength
D—width and depth of duct ($D^2 = A$)
F—magnetoelectric force on fluid
$g_0$—constant of proportionality in Newton's second law
h—enthalpy
$\Delta H$—work available from the gas
j—electrical current
k—ratio of specific heats ($k = c_p/c_v$)
K—electrical efficiency of MHD device
l—variable along the length of the MHD device
L—length of the MHD device
$L_V$—total viscous losses in the metal loop
n—dimensionless variable defined by Equation 2
P—pressure
$\Delta P$—system pressure drop
$P_{in}$—hydraulic power at inlet of MHD device
$P_{out}$—total power removed from fluid in MHD device
$P_{el}$—electrical power per unit volume of MHD device
Q—heat flow
R—gas constant
T—temperature
V—velocity
$W_g$—mass flow rate of gas
$W_m$—mass flow rate of metal
$W_{out}$—total work output of cycle
$\gamma_m$—mass density of the metal
$\epsilon$—effectiveness of the heat exchanger
$\eta$—overall efficiency of the system
$\eta_C$—Carnot efficiency
$\eta_D$—diffuser efficiency
$\eta_{el}$—electrical efficiency
$\eta_h$—hydraulic efficiency
$\lambda$—friction factor
$\sigma$—electrical conductivity Subscripts refer to stations in FIGURES 5 and 6.

After the electrical energy has been extracted at the exit 57 of the generator 56, FIGURE 6, sufficient kinetic energy must be left in the metal to overcome the pressure rise between the pressure $P_{57}$ at exit 57 and the pressure $P_{49}$ at the injector 49. This diffuser 58 will have an efficiency, $\eta_D$:

$$\frac{\Delta P}{\gamma_m} = \frac{P_{49} - P_{57}}{\gamma_m} = \eta_D \frac{V_{57}^2}{2g_0} \quad (1)$$

Since the diffuser 58 loss should be small compared to the whole energy transfer, particularly as compared to the kinetic energy which is available at point 55 where the velocity is $V_{55}$, we may write:

$$(1 - \eta_D)\frac{V_{57}^2}{2g_0} = \frac{1}{n}\frac{V_{55}^2}{2g_0} \quad (2)$$

where n is a number of the order of 10 to 20, a design parameter of our choice. Now the kinetic energy $$W_m \frac{V_{55}^2}{2g_0}$$

is supplied by the available energy $\Delta H$ in the expanding gas and the displacement work in the metal:

$$W_m \frac{V_{55}^2}{2g_0} = W_g(\Delta H) + W_m \frac{\Delta P}{\gamma_m} \quad (3)$$

which leads to $$\frac{W_m}{W_g} = \frac{\Delta H}{\frac{V_{55}^2}{2g_0} - \frac{\Delta P}{\gamma_m}} \quad (4)$$

From Equations 1 and 2, one obtains $$\frac{V_{55}^2}{2g_0} = n\frac{\Delta P}{\gamma_m}\left(\frac{1 - \eta_D}{\eta_D}\right) \quad (5)$$

which leads finally to the ratio of the metal and gas flow rate:

$$\frac{W_m}{W_g} = \frac{\Delta H}{\frac{\Delta P}{\gamma_m}\left(\frac{n}{\eta_D} - n - 1\right)} \quad (6)$$

The overall efficiency of the whole device is defined as the ratio of the electrical output to available work from the gas. This can be written as the product of the electrical efficiency and a hydraulic efficiency as follows:

$$\eta = \eta_{el}\left(1 - \frac{L_V W_m}{\Delta H W_g}\right) = \eta_{el}\eta_h \quad (7)$$

where $L_V$ is the sum of the viscous losses and $\Delta H$ is the work which is available from the gas. The viscous losses are the sum of the channel losses in the MHD generator 56 and the losses in the diffuser 58. Losses in the expansion nozzle will be taken care of by properly defining the actually available work ($\Delta H$) in the expanding gas. These latter losses are not high since no losses due to heat transfer are expected. As a result, one can write $$L_V = \lambda\frac{L}{D}\frac{V_{55}^2}{2g_0} + (1 - \eta_D)\frac{V_{57}^2}{2g_0} \quad (8)$$

which transforms by means of Equation 2, $$L_V = \left(\lambda\frac{L}{D} + \frac{1}{n}\right)\frac{V_{55}^2}{2g_0}\frac{1}{\frac{\Delta P}{\gamma_m}\left(\frac{n}{\eta_D} - n - 1\right)} \quad (8a)$$

and using Equation 6, one obtains finally, $$\frac{W_m}{W_g}\frac{L_V}{\Delta H} = \left(\lambda\frac{L}{D} + \frac{1}{n}\right)\frac{V_{55}^2}{2g_0}\frac{1}{\frac{\Delta P}{\gamma_m}\left(\frac{n}{\eta_D} - n - 1\right)} \quad (9)$$

Using Equation 4, one obtains, $$\eta_h = 1\left(n\frac{1 - \eta_D}{\eta_D}\right)\frac{\lambda\frac{L}{D} + \frac{1}{n}}{\frac{n}{\eta_D} - n - 1} \quad (10)$$

Equation 10 is plotted on FIGURE 14.

It is seen that the obtaining of high hydraulic efficiency is essentially a function of a very small $L/D$ in the region of high velocity, that is, a small $L/D$ for the MHD generator. Since $\lambda$ is of the order of 0.04, values of $L/D$ between 1 and 4, and n between 10 and 30 are desirable. These figures would lead to hydraulic efficiencies as high as 90 percent.

In the region between points 55 and 57 on FIGURE 6, the metal does work against the electric field at the rate equal to the force times the velocity. The current created by a magnetic field B is given by $$j = \sigma KVB \quad (11)$$

The force per unit volume is given by $$F = j \times B \quad (12)$$

and as a result, the power per unit volume which the liquid delivers against the electric forces is given by $$P_{out} = j \times B \times V \quad (13)$$

Of course, the electrical useful output is decreased below this energy delivered by the fluid work by the amount of ohm losses such that $$\text{electric output} = jBV - j^2\frac{1}{\sigma} \quad (14)$$

and finally, the electric efficiency is obtained as follows:

$$\eta_{el} = \frac{\text{electric output}}{\text{mechanical output}} = 1 - \frac{\sigma^2 K^2 V^2 B^2 \sigma}{\sigma K V^2 B^2} = 1 - K \quad (15)$$

To get the total electrical output, Equation 14 has to be integrated over the whole volume in view of the fact that the velocity varies as a function of the length L from point 55 to point 57. This is expressed by Equation 16:

$$P_{el} = (1-K)K\sigma \int_0^L V^2 B^2 A\, dl \tag{16}$$

Now the energy expended by the liquid against the electrical forces as expressed above has as a direct result the decrease of the kinetic energy in the liquid. This is expressed by Equation 17, $$K\sigma V^2 B^2 (A\, dl) = \gamma_m A V d \frac{V^2}{2g_0} \tag{17}$$

which can be integrated to yield:

$$\frac{g_0 K\sigma B^2 L}{\gamma_m} = V_{55}\left(1 - \frac{V_{57}}{V_{55}}\right) \tag{18}$$

From Equation 2 the ratio of the velocities at the beginning and the end of the MHD generator can be expressed as follows:

$$\frac{V_{55}}{V_{57}} = \sqrt{n(1-\eta_D)} \tag{19}$$

It is remembered that the quantity which should be established is the length-to-diameter ratio of the MHD generator. This can now be obtained as follows:

$$\frac{L}{D_{55}} = \frac{\gamma_m \left(1 - \frac{1}{\sqrt{n(1-\eta_D)}}\right) V_{55}}{g_0 K \sigma B^2 D_{55}} \tag{19a}$$

Defining the kinetic energy at the entrance of the MHD generator by the input power $P_{in}$:

$$P_{in} = \gamma_m \frac{V_{55}^3 D_{55}^2}{2g_0} \tag{20}$$

The diameter at the entrance of the MHD generator may be expressed in terms of the input power and velocity as follows:

$$D_{55} = \sqrt{\frac{2g_0 P_{in}}{\gamma_m V_{55}^3}} \tag{21}$$

This, of course, assumes that the cross section at that point is a square. Using Equations 19 and 20 yields the final result as follows:

$$\frac{L}{D_{55}} = \frac{\gamma_m^{3/2}\left(1 - \frac{1}{\sqrt{n(1-\eta_D)}}\right)V_{55}^{5/2}}{g_0^{3/2} K\sigma B^2 \sqrt{2P_{in}}} \tag{22}$$

For brevity and clarity, some details have been left out. However, Equation 22 is a guideline of unusual importance. We remember that we wish to obtain small length-to-diameter ratios in order to obtain high hydraulic efficiency according to FIGURE 14. With the properties of sodium $\gamma_m = 58$ lb./cu. ft. and a conductivity $\sigma = 18 \times 10^6$ mho-meter, and a magnetic field of 8000 gauss, we may plot the velocity at the inlet of the MHD generator as a function of the kinetic energy at the inlet of the generator if we assume a value of $L/D_{55} = 2$ and $n = 20$, which yields a hydraulic efficiency above 80 percent, and if we assume further that $K = 0.1$, which yields an electric efficiency of 90 percent.

From this velocity at the MHD generator inlet, we may obtain from Equation 2 the velocity at the diffuser 58 inlet and from Equation 1 the pressure difference $P_{49} = P_{57}$. This value, together with $V_{55}$, has been plotted in FIGURE 15 as a function of the electric output.

The electric energy is obtained from the differences of the kinetic energies in and out of the MHD generators, see Equation 20, considering that the electric efficiency (1−K) is 0.9. From FIGURE 15 it is seen that for these particular assumptions the pressure differences in a working device are somewhat limited. It is clear that these pressure differences can go up considerably if a larger length-to-diameter ratio is assumed or a smaller $n$. Specifically, FIGURE 15 shows also $\Delta P$ and $V_{55}$ for $n = 10$ and $L/D_{55} = 4$.

A working gas should be used which has essentially the temperature-entropy diagram shown on FIGURE 5 consistent with the above restrictions, shown on FIGURE 15, of pressure differences between states $f$ and $g$ of FIGURE 5. The pressure ratio can be chosen freely as yet. However, if a large pressure ratio is chosen with a given small pressure difference, necessarily the pressure corresponding to state $g$ in FIGURE 5, called $P_{57}$ in the above calculations, may become very small. This may lead to a large nozzle exit area at point 51 of FIGURE 6.

A remark about the relationship between the obtainable efficiencies and the chosen pressure ratio is in order. With a thermodynamic cycle as shown on the temperature entropy diagram of FIGURE 5, a heat exchanger must be used, cooling the exhaust gas from state $g$ and simultaneously heating the compressed liquid from state $e$ to possibly state $f$. This heat exchanger 46, FIGURE 4, will have a finite effectiveness. If this heat exchanger would have an effectiveness equal to 1, then the efficiency of the cycle indicated on FIGURE 5 would be equal to the Carnot efficiency between the temperatures. The heat exchanger effectiveness is defined for the purpose of this discussion as the difference in enthalpy between states $e$ and $j$, divided by the difference in enthalpy between states $f$ and $j$ in FIGURE 5:

$$\epsilon = \frac{h_e - h_j}{h_f - h_j} \tag{23}$$

As a result of having to heat the liquid or gas which is introduced at state $e$ to state $f$, more heat has to be added to the cycle than the expansion work from states $g$ to $h$ in FIGURE 5, Equation 25. The work output in the closed cycle is essentially given by the following expression:

$$W_{out} = (T_g - T_j) R \ln \frac{P_f}{P_g} \tag{24}$$

The heat which is added between stations $f$ and $g$ is given by Equation 25:

$$Q_{f-g} = RT_g \ln P_f/P_g \tag{25}$$

and the additional heat which has to be added from $e$ to $f$ may be approximated by:

$$Q_{e-f} = (1-\epsilon) R \frac{k}{K-1}(T_g - T_j) \tag{26}$$

As a result, the efficiency of the cycle is given by $$\eta = \frac{R(\ln P_f/P_g)(T_g - T_j)}{RT_g(\ln P_f/P_g) + (1-\epsilon)\frac{k}{k-1}R(T_g - T_j)} \tag{27}$$

If the Carnot efficiency is defined as $$\eta_C = \frac{T_g - T_j}{T_g} \tag{27a}$$

the final efficiency may be expressed as follows:

$$\eta = \eta_C\left[1 + (1-\epsilon)\frac{k}{k-1}\frac{\eta_C}{\ln P_f/P_g}\right] \tag{28}$$

It is seen that the efficiency will equal the Carnot efficiency if the heat exchanger effectiveness is equal to 1. However, if the heat exchanger effectiveness is below 1, it is desirable to make the pressure ratio large in order to nullify the heat exchanger ineffectiveness.

The remark above justifies the desire for high pressure ratio and therefore for high $\Delta P$ if the minimum pressure of the cycle is to be larger than a certain value. There is also another reason for the desirability of large $\Delta P$. This is the desire for high power output per unit volume which can be explained as follows:

If $l$ is the independent variable expressing the length along the MHD generator of FIGURE 6, varying from 0 at point 55 to L at point 57, the total electric power given by Equation 16 may be evaluated by writing Equation 18 in a more general form where $V_{57}$ is replaced by $V(l)$:

$$V(l) = V_{55} - \frac{g_0 K \sigma B^2 l}{\gamma_m} \quad (29)$$

The area by continuity can also be expressed as a function of $l$:

$$A = A_{55} \frac{V_{55}}{V(l)} \quad (30)$$

If B is constant in Equation 16, it becomes:

$$P_{el} = (1-K) K \sigma B^2 A_{55} V_{55}^2 \int_0^T \left(1 - \frac{g_0 K \sigma B^2 l}{V_{55} \gamma_m}\right) dl \quad (30a)$$

or $$P_{el} = (1-K) K \sigma B^2 A_{55} V_{55}^2 \left(L - \frac{L^2}{2} \frac{g_0 K \sigma B^2}{V_{55} \gamma_m}\right) \quad (30b)$$

in which by Equation 18 and 19, $$\frac{g_0 K B^2 \sigma L}{V_{55} \gamma_m} = 1 - \frac{1}{\sqrt{n(1-\eta_D)}} = \frac{\sqrt{n(1-\eta_D)} - 1}{\sqrt{n(1-\eta_D)}} \quad (30c)$$

so that, $$P_{el} = (1-K) K \sigma B^2 A_{55} V_{55}^2 L \left(1 - \tfrac{1}{2} + \frac{1}{\sqrt{n(1-\eta_D)}}\right) \quad (31)$$

On the other hand, the total volume of the MHD generator is $$\text{Vol.} = \int_0^L A\, dl = A_{55} V_{55} \int_0^L \frac{dl}{V(l)} = A_{55} \int_0^L \frac{dl}{1 - \frac{g_0 K \sigma B^2}{\gamma_m V_{55}}} \quad (31a)$$

$$= A_{55} L \int_0^1 \frac{d\frac{l}{L}}{\frac{g_0 K \sigma B^2 L}{\gamma_m V_{55}} \frac{l}{L}} \quad (31b)$$

$$= A_{55} L \left\{ \frac{-\gamma_m V_{55}}{g_0 K \sigma B^2 L} \ln \left[ -\frac{g_0 K \sigma B^2 L}{\gamma_m V_{55}} \frac{l}{L} \right]_0^1 \right\} \quad (31c)$$

$$= A_{55} L \left\{ \frac{-\sqrt{n(1-\eta_D)}}{\sqrt{n(1-\eta_D)} - 1} \ln \frac{1}{\sqrt{n(1-\eta_D)}} \right\} \quad (31d)$$

$$= A_{55} L \frac{\sqrt{n(1-\eta_D)}}{2\sqrt{n(1-\eta_D)} - 1} \ln [n(1-\eta_D)] \quad (32)$$

Dividing equation 31 by Equation 32 gives the power output per unit volume of the MHD generator:

$$P_{el} = \frac{P_{el}}{\text{Vol.}} = (1-K) K \sigma B^2 V_{55}^2 \frac{\sqrt{n(1-\eta_D)} + 1}{\sqrt{n(1-\eta_D)}}$$

$$\frac{\sqrt{n(1-\eta_D)} - 1}{\sqrt{n(1-\eta_D)}} \frac{1}{\ln [n(1-\eta_D)]} \quad (32a)$$

$$P_{el} = (1-K) K \sigma B^2 V_{55}^2 \frac{n(1-\eta_D) - 1}{n(1-\eta_D) \ln [n(1-\eta_D)]} \quad (33)$$

Equation 33 presents the second reason for the desire for large $\Delta P$ which is tantamount to large $V_{55}$ by Equation 5. Using Equation 5 in Equation 33 gives $$P_{el} = (1-K) K \sigma B^2 \frac{2g_0 \Delta P}{\gamma_m} \frac{n(-\eta_D) - 1}{\eta_D \ln [n(1-\eta_D)]} \quad (34)$$

On FIGURE 16 this relation is plotted in kw./cu. in. as a function of $\Delta P$ from 0 to 2000 p.s.i. with the following assumed values $$K = 0.1$$
$$\sigma = 1.8 \times 10^7 \text{ mho/meter}$$
$$B = 8000 \text{ gauss}$$
$$\gamma_m = 58 \text{ lb./cu. ft.}$$
$$\eta_D = 0.80$$
$$\text{Case 1 } n = 10$$
$$\text{Case 2 } n = 20$$

From FIGURE 16 in conjunction with FIGURE 15, the size of the conversion device can be inferred. It is noted that according to Equation 34, the power per unit volume reaches a maximum for $n = 1/1 - \eta_D$ when the volume according to Equation 32 becomes 0, and therefore the power output vanishes consistent with the definition of $n$, Equation 2.

Similar calcuations have been performed for the displacement energy converter although they are more complicated since additional quantities can be varied. As a general conclusion from these calculations, the hydraulic efficiency of the displacement energy converter can be made even high than the kinetic energy converter shown in FIGURE 6. However, a larger volume is necessary for a given kilowatt output.

It is apparent that a novel and useful power conversion system has been provided. A system constructed in accordance with this invention is particularly suitable in applications where high efficiency is desired and where the power has to be produced over a relatively long period of time such as one day or more. Such a system is particularly adapted for use as auxiliary power producing systems for space vehicles, since the system has both a very high efficiency and a very high power output per unit weight or volume. Since the system operates by transferring energy available in a high pressure gas to a liquid, the velocity of the gas is substantially reduced so that turbines and magnetohydrodynamic generators having very high efficiencies can be utilized. When a turbine is being used in the system as an energy converter, the liquid accelerated by the gases is directed through the turbine, and the turbine rotor is connected to drive such mechanisms as electrical generators, pumps, etc. A liquid can also be used which is electrically conductive and, in this event, the liquid is passed through a magnetohydrodynamic generator of electricity. The invention also discloses unique means for injecting the working gas into the liquid in the form of many small bubbles and subsequently separating the liquid from the gas so that either the liquid or the gas, or both, can be used again.

It will be apparent that modifications and variations may be effected without departing from the scope of the novel concepts of the present invention, and it will be understood that this application is to be limited only by the scope of the appended claims.

I claim as my invention:

1. An energy conversion system comprising means including a continuously gas porous wall for injecting a gas in the form of small, discrete bubbles into an electrically conductive liquid to maintain a high electrical conductivity therein, and a magnetohydrodynamic generator connected to receive the liquid.

2. An energy conversion system comprising means including a continuously gas porous wall for injecting a gas in the form of small, discrete bubbles into an electrically conductive liquid to maintain a high electrical conductivity therein, and a magnetohydrodynamic generator connected to receive the liquid, the temperature of said gas being relatively higher than the temperature of said liquid.

3. An energy conversion system comprising means including a continuously gas porous wall for injecting a gas in the form of small, discrete bubbles into an electrically conductive liquid to maintain a high electrical conductivity therein, and a magnetohydrodynamic generator connected to receive the liquid, the temperature of said liquid being relatively higher than the temperature of said gas.

4. An energy conversion system comprising a nozzle, means including a continuously gas porous wall disposed at the entrance to said nozzle which is adapted to be connected to a source of high pressure gas and is adapted to inject the gas in the form of small, discrete bubbles into a liquid flowing through said nozzle to maintain a high electrical conductivity therein, separating means connected to the exit of said nozzle for separating the gas from the liquid, a magnetohydrodynamic generator connected to said separating means in such a manner as to receive the flow of the liquid, and fluid passageway means connected to the outlet of said generator and to the inlet of said nozzle.

5. An energy conversion system comprising a nozzle having an inlet and an outlet, injection means including a continuously gas porous wall disposed at said nozzle inlet which is adapted to inject a gas in the form of small, discrete bubbles into a stream of liquid flowing through said nozzle to maintain a high electrical conductivity therein, separating means connected to said nozzle outlet which is adapted to receive the mixture of gas and liquid and separate the gas from the liquid, said separating means having a gas outlet and a liquid outlet, said liquid outlet being connected to the input to a magnetohydrodynamic generator, first conduit means connecting the outlet of said generator to the inlet of said nozzle, second conduit means connected to the gas outlet of said separating means and to said injection device, and heating means coupled to said second conduit for heating gas flowing therethrough.

6. An energy conversion system comprising a nozzle having an inlet and an outlet, a fluid passageway for an electrically conductive liquid connected to the inlet of said nozzle, a gas injection device including a continuously gas porous wall mounted at the inlet of said nozzle for injecting a high pressure gas in the form of small, discrete bubbles into said liquid to maintain a high electrical conductivity therein, separating means connected to the outlet of said nozzle which is adapted to separate the liquid from the gas, said separating means having a gas outlet and a liquid outlet, a magnetohydrodynamic generator connected to said liquid outlet, a diffuser connected to the exhaust outlet of said generator, the outlet of said diffuser being connected to said fluid passageway, a condenser connected to said gas outlet of said separating means, heating means connected to the outlet of said condenser, conduit means connected to the outlet of said heating means and to said gas injection means, and pump means adapted to cause condensed gas to flow through said heating means to said gas injection means.

7. An energy conversion system comprising a nozzle having an inlet and an outlet, means including a continuously gas porous wall disposed at said nozzle inlet for injecting a gas in the form of small, discrete bubbles into a stream of electrically conductive liquid flowing through said nozzle to maintain a high electrical conductivity therein, and a magnetohydrodynamic generator connected to said nozzle outlet.

8. An energy conversion system comprising a nozzle having an inlet and an outlet, gas injection means disposed at said nozzle inlet which is adapted to be connected to a source of high pressure gas and to inject the gas into a stream of electrically conductive liquid flowing through said nozzle, a magnetohydrodynamic generator connected to said nozzle outlet, separating means connected to said generator exhaust for separating the liquid from the gas, and conduit means connected to receive liquid from said separating means and return it to said nozzle inlet.

9. An energy conversion system comprising a nozzle having an inlet and an outlet, a gas injection means disposed at said nozzle inlet for injecting a gas into an electrically conductive liquid flowing through said nozzle, a magnetohydrodynamic generator connected to said nozzle outlet, separating means connected to said generator outlet which has a gas outlet and a liquid outlet, diffuser means connected to said liquid outlet of said separating means, first fluid passageway means connected from said diffuser to said nozzle inlet, said first fluid passageway means being adapted to be coupled to a heat source, second fluid passageway means connected to said gas outlet of said separating means, a condenser connected to said second fluid passageway means, and third fluid passageway means connecting the outlet of said condenser to said gas injection means, said second and third fluid passageway means being in heat exchange relation.

10. An energy conversion system comprising a fluid passageway, means including a continuously gas porous wall disposed in said fluid passageway for injecting a gas in the form of small, discrete bubbles into an electrically conductive liquid flowing through said fluid passageway to maintain a high electrical conductivity therein, a nozzle having its inlet connected to said fluid passageway, the outlet of said nozzle being connected to the input to a vortex separating means for separating the gas from the liquid, a magnetohydrodynamic generator connected to the outlet of said separating means in such a manner as to receive the flow of the liquid, a diffuser connected to the outlet of said generator and to the inlet of said fluid passageway, and means connected to said fluid passageway means for removing a portion of the liquid, passing it through a heating means, and returning the liquid to the fluid passageway means.

11. An energy conversion system comprising a fluid passageway, a nozzle having its inlet connected to said fluid passageway, means disposed in said fluid passageway for injecting a gas under pressure into an electrically conductive liquid flowing through said fluid passageway into said nozzle, a magnetohydrodynamic generator having its inlet connected to the outlet of said nozzle, the outlet of said generator being connected to the inlet of a vortex separating means, the outlet of said separating means being connected to the inlet of a diffuser, the outlet of said diffuser being connected to said fluid passageway, and means coupled to said fluid passageway for heating a portion of the liquid flowing therethrough.

References Cited by the Examiner

UNITED STATES PATENTS

| | | | |
|---|---|---|---|
| 448,621 | 3/1891 | Altham | 60—40 |
| 1,196,511 | 8/1916 | Borger | 310—11 X |
| 1,530,468 | 3/1925 | Elliott | 310—11 |
| 1,878,217 | 9/1932 | Wempe | 60—39 |
| 1,916,076 | 6/1933 | Rupp | 310—11 |
| 2,151,949 | 3/1939 | Turner | 60—40 |
| 2,215,497 | 9/1940 | Doczekal | 60—39 |
| 2,917,295 | 12/1959 | Hauer | 261—124 |
| 2,971,604 | 2/1961 | Lowery | 55—199 |
| 2,986,382 | 5/1961 | Langdon | 261—124 |
| 3,004,626 | 10/1961 | Brinen | 55—199 |
| 3,031,977 | 5/1962 | Elliott | 103—258 |

FOREIGN PATENTS

| | | |
|---|---|---|
| 841,613 | 6/1952 | Germany. |
| 29,508 | 1897 | Great Britain. |
| 694,918 | 7/1953 | Great Britain. |

MILTON O. HIRSHFIELD, *Primary Examiner.*

DAVID X. SLINEY, *Examiner.*

J. A. HINKLE, *Assistant Examiner.*